US012780667B2

(12) United States Patent
Chu et al.

(10) Patent No.: US 12,780,667 B2
(45) Date of Patent: Nov. 3, 2026

(54) EFFICIENT PURIFICATION METHOD FOR NANODIAMONDS

(71) Applicant: VERSITECH LIMITED, Hong Kong (HK)

(72) Inventors: Zhiqin Chu, Hong Kong (HK); Tongtong Zhang, Hong Kong (HK)

(73) Assignee: UNIVERSITY OF HONG KONG VERSITECH LIMITED, Hong Kong (HK)

( * ) Notice: Subject to any disclaimer, the term of this patent is extended or adjusted under 35 U.S.C. 154(b) by 616 days.

(21) Appl. No.: 18/033,080

(22) PCT Filed: Oct. 21, 2021

(86) PCT No.: PCT/CN2021/125267
§ 371 (c)(1),
(2) Date: Apr. 21, 2023

(87) PCT Pub. No.: WO2022/095707
PCT Pub. Date: May 12, 2022

(65) Prior Publication Data
US 2023/0391625 A1 Dec. 7, 2023

Related U.S. Application Data

(60) Provisional application No. 63/109,956, filed on Nov. 5, 2020.

(51) Int. Cl.
*C01B 32/28* (2017.01)

(52) U.S. Cl.
CPC .......... *C01B 32/28* (2017.08); *C01P 2004/64* (2013.01); *C01P 2006/80* (2013.01)

(58) Field of Classification Search
CPC ... C01B 32/28; C01P 2004/64; C01P 2006/80
See application file for complete search history.

(56) References Cited

U.S. PATENT DOCUMENTS

2017/0009350 A1* 1/2017 Myllymaki .............. C25D 5/50

FOREIGN PATENT DOCUMENTS

JP H09328307 A * 12/1997

OTHER PUBLICATIONS

S. Stehlik et al. "Size and nitrogen inhomogeneity in detonation and laser synthesized primary nanodiamond particles revealed via salt-assisted deaggregation," Carbon 2021, 171, 230-239; available online Sep. 9, 2020. (Year: 2020).*

(Continued)

*Primary Examiner* — Paul A Wartalowicz
*Assistant Examiner* — Nicholas A. Piro
(74) *Attorney, Agent, or Firm* — Amin, Turocy & Watson, LLP

(57) ABSTRACT

Disclosed are methods of purifying nanodiamonds and a method of making essentially pure nanodiamonds each involving mixing nanodiamonds with at least one salt to form a mixture; heating the mixture at a temperature from 200° C. to 1,000° C. for a time from 10 minutes to 10 hours; and combining a liquid with the heated mixture and centrifuging at a speed of 30 rcf to 25,000 rcf for a time from 10 seconds to 60 minutes to provide purified nanodiamonds. With the methods of the invention, pure NDs can be produced by one-step processing after air oxidation, without the need for any further centrifugation acts. Furthermore, the developed salt-assisted air oxidation method enables facile scale-up manufacturing of clean NDs, with a rounded shape transformed from original shard-like shape, which is impossible to achieve using any existing purification method.

13 Claims, 8 Drawing Sheets

(56) References Cited

OTHER PUBLICATIONS

English machine translation of JP H09328307 A. (Year: 1997).*

M. Mobin, A.U. Malik and Sultan Ahmad. "High Temperature Interactions of Metal Oxides with NaCl," J. Less-Common Met. 1990, 160, 1-14 (Year: 1990).*

A. Wolcott et al. "Surface Structure of Aerobically Oxidized Diamond Nanocrystals," J. Phys. Chem. C 2014, 118, 26695-26702. (Year: 2014).*

Dmitry S. Volkov , Petr K. Krivoshein, Ivan V. Mikheev, Mikhail A. Proskurnin. "Pristine detonation nanodiamonds as regenerable adsorbents for metal cations," Diamond & Rel. Mater. 2020, 110, 108121 (Year: 2020).*

Westlab. "Differences Between RCF and RPM in Centrifugation," Retrieved from the Internet: <URL: https://www.westlab.com/blog/difference-between-rcf-and-rpm-in-centrifugation>; Accessed Feb. 9, 2026. (Year: 2023).*

International Search Report, Written Opinion and International Preliminary Report for International Application No. PCT/CN2021/125267 mailed on Jan. 19, 2022, 9 pages.

* cited by examiner

EFFICIENT PURIFICATION METHOD FOR NANODIAMONDS

TECHNICAL FIELD

The present invention relates to methods of making and purifying nanodiamonds.

BACKGROUND ART

Nanoscale diamond particles (with a size below 1 μm), generally known as nanodiamonds (NDs), have several outstanding material qualities, offering a wide range of potential for basic science and industrial applications. In particular, a number of optically addressable impurity defects, such as nitrogen-vacancy (NV) centers residing in the diamond lattice, have been deployed for next-generation quantum technologies due to their unique spin properties.

Currently, there are mainly two methods for the large-scale fabrication of NDs: "bottom-up" detonation NDs and "top-down" milling of bulk high-pressure high-temperature (HPHT) diamond. It is well known that the raw ND powders (i.e., detonation or HPHT) contain a considerable amount of unwanted impurities [e.g., ultrasmall (<10 nm)-sized NDs, disordered carbons, metal, and metal oxides], which are naturally introduced during synthesis and processing. However, previous reports have demonstrated that the non-diamond phases present at the surface of NDs are detrimental to the properties of embedded quantum defects (e.g., NV centers). Therefore, the removal of these impurities becomes a critical step before the ultimate applications of the NDs. For example, the fluorescence lifetime and spin-coherence time (T 2) of NV centers in NDs could be significantly improved by cleaning the surface quenchers (e.g., fluorescent graphitic carbon). This has proven to be quite beneficial for potential applications in photonics, quantum sensing, and imaging. Moreover, a sufficiently clean and uniform surface of NDs, desired for favorable nanobiointeractions, is a prerequisite for potential biomedical applications in drug delivery, biolabeling, and biosensing.

At present, the most commonly used method of removing non-diamond carbons involves the surface oxidization of raw NDs in the presence of air at 400-600° C. for several hours. The resultant oxygenated functional groups on the surface of the NDs have been shown to stabilize the NV charge states, increase the colloidal stability in aqueous solution, and prolong the NV spin coherence times. However, the conventional air oxidation approach is to put NDs powder alone in furnace for calcination, and a considerable amount of impurities are associated with such a process. The impurities are mainly amorphous carbon nanoparticles with a size range in a few tens of nm, which are difficult to remove. The impurities are mainly amorphous carbon nanoparticles due to calcination of crystalline NDs in air, with a size range in a few tens of nm. Those nanoparticles are impossible to remove by separation methods such as centrifugation at low speed (e.g., 1,000 rcf), and might be gradually removed by multiple rounds of high-speed centrifugation (e.g., 10,000 rcf). The additional centrifugation steps not only lead to more waste of the NDs sample, but also facilitate the severe negative issue of ND agglomeration.

Alternatively, wet chemical treatments (e.g., $HNO_3$/$H_2SO_4$/$HClO_4$) have also been adopted to remove both non-diamond carbons and metallic impurities in NDs. However, the use of these liquid phase protocols is costly, and the employment of hazardous chemicals carries environmental risks. Despite the considerable effort devoted to overcoming these challenges, it is still difficult to obtain NDs with a well-defined surface, especially when examined at the individual particle level.

In accordance with the well-established procedure for the liquid etching of bulk diamonds, the NDs have already been intensively etched with molten potassium nitrate ($KNO_3$), that is, heated at 500-600° C. for several minutes. This intensive etching treatment has been shown to produce NDs with a much cleaner surface and more rounded morphology than those treated with gas oxidation methods. The rounded NDs also exhibit improved optical properties and excellent colloidal stability. However, this molten-salt process involves complicated procedures, requires professional protective equipment, and these disadvantages have so far prevented its general adoption.

Thus, there is a desire for a more convenient method that enables scale-up manufacturing of clean NDs.

DISCLOSURE OF THE INVENTION

It is the objective of the present invention to provide a highly efficient purification method for NDs.

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

As described herein, a highly efficient purification method for NDs (with a size below 1 μm) by salt-assisted air oxidation (SAAO) is explained. With the methods described herein, the pure NDs (without any detectable amorphous carbon nanoparticles) can be produced by one-step processing (e.g., centrifugation at 1,000 rcf for 5 minutes) after air oxidation, without the need for any further centrifugation acts. Furthermore, the developed SAAO method enables facile scale-up manufacturing of clean NDs, with a rounded shape transformed from the original shard-like shape, which is impossible to achieve using any existing purification method.

Disclosed herein are methods of purifying NDs comprising mixing NDs with at least one salt to form a mixture; heating the mixture at a temperature from 200° C. to 1,000° C. for a time from 10 minutes to 10 hours; and combining a liquid with the heated mixture and centrifuging at a speed of 30 rcf to 25,000 rcf for a time from 10 seconds to 60 minutes to provide purified NDs.

Also disclosed are methods of making essentially pure NDs comprising mixing NDs with at least one salt to form a mixture; heating the mixture at a temperature from 200° C. to 1,000° C. for a time from 10 minutes to 10 hours; and combining a liquid with the heated mixture and centrifuging at a speed of 30 rcf to 25,000 rcf for a time from 10 seconds to 60 minutes to provide essentially pure NDs with less than 0.01% by weight impurities.

Purification of NDs is the primary step to realize most of their quantum applications, e.g., surface oxidization (i.e., aerobic, or anaerobic triacid oxidation) methods have been commonly used for removing the surface-covering non-diamond structures (e.g., $sp^2$ carbon, $sp^2$ clusters). The conventional method for this is air oxidation treatment of NDs at 400-600° C. (to put NDs power alone in a furnace for calcination). However, there are a considerable amount of impurities associated with such a process. The impurities are mainly amorphous carbon nanoparticles due to calcination of crystalline NDs in air, with a size range in a few tens of nm. Those nanoparticles are impossible to remove by separation methods such as centrifugation at low speed (e.g., 1,000 rcf), and might be gradually removed by multiple rounds of high-speed centrifugation (e.g., 10,000 rcf). The additional centrifugation steps not only lead to more waste of the NDs sample, but also facilitate the severe negative issue of ND agglomeration. As described herein, a highly efficient purification method for NDs by SAAO is explained. With the novel systems and methods described herein, pure NDs (without any (or barely any) detectable amorphous carbon nanoparticles) can be produced by one-step processing (centrifugation at 1,000 rcf for 5 minutes) after air oxidation, no need for any further centrifugation steps.

The following description and the drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In order to explain the embodiments of the present invention or the technical solutions in the prior art more clearly, drawings required for the description of the embodiments of the present invention will be briefly described below. Obviously, the drawings in the following description are only some embodiments of the present invention.

BEST MODE FOR CARRYING OUT THE INVENTION

Figure 1:
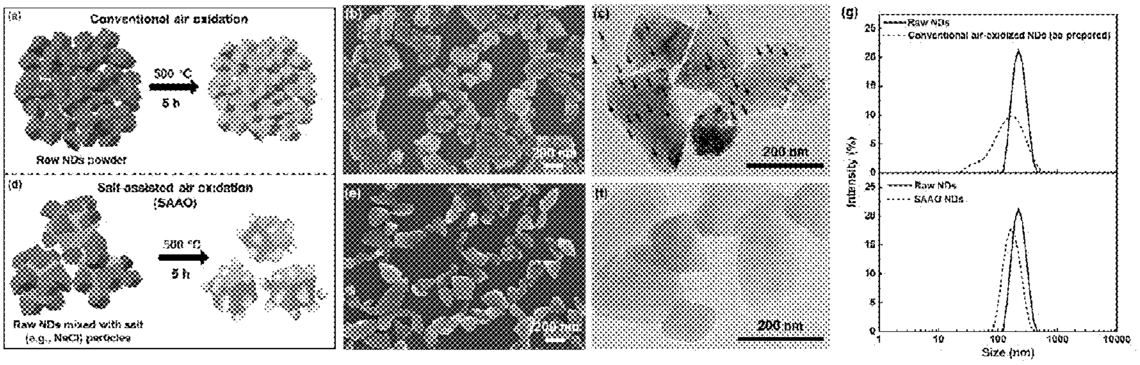
FIG. 1 depicts the (a) schematic illustration of the conventional air oxidation process. (b) Scanning Electron Microscope (SEM) and (c) Transmission Electron Microscope (TEM) images of the conventional air-oxidized (500° C., 5 hours) NDs. The small-sized nanoparticles on the surface of the NDs are indicated by black arrows in the TEM image. (d) Schematic illustration of the SAAO process. (e) SEM and (f) TEM images of the SAAO (500° C., 5 hours) NDs. (g) DLS size distribution of the raw, conventional air-oxidized and SAAO NDs.

In general, the method of purifying NDs according to the invention comprises the following steps:

- mixing NDs (with a size below 1 μm) with at least one salt to form a mixture;

heating the mixture at a temperature from 200° C. to 1,000° C. for a time of from 10 minutes to 10 hours; and combining a liquid with the heated mixture and centrifuging at a speed of 30 rcf to 25,000 rcf for a time from 10 seconds to 60 minutes to provide purified NDs.

NDs are initially mixed with a suitable amount of salt before heating. In one embodiment, a unit weight of NDs is mixed with 0.1 to 100 times an amount of a salt. In another embodiment, a unit weight of ND is mixed with 0.5 to 50 times an amount of a salt. In yet another embodiment, a unit weight of ND is mixed with 1 to 10 times an amount of a salt.

The salt is any salt that facilitates surface oxidation of NDs. A salt is an ionic compound having an anion and cation. General examples of salts that can be employed include one or more of alkaline earth metal halogens, sulfates, persulfates, nitrates, phosphates, and the like; alkali metal halogens, sulfates, persulfates, nitrates, phosphates, and the like; transition metal halogens, sulfates, persulfates, nitrates, phosphates, and the like; ammonium halogens, sulfates, persulfates, nitrates, phosphates, and the like; quaternary alkyl ammonium halogens, sulfates, persulfates, nitrates, phosphates, and the like. Specific examples of salts that can be employed include one or more of sodium chloride, magnesium chloride, potassium chloride, calcium chloride, ammonium chloride, sodium sulfate, magnesium sulfate, potassium sulfate, calcium sulfate, ammonium sulfate, and the like.

The ND/salt mixture is then heated at a suitable temperature for a suitable period of time to facilitate surface oxidation of NDs. In one embodiment, the ND/salt mixture is heated at a temperature from 200° C. to 1,000° C. for a time from 10 minutes to 10 hours. In another embodiment, the ND/salt mixture is heated at a temperature from 300° C. to 800° C. for a time from 30 minutes to 8 hours. In yet another embodiment, the ND/salt mixture is heated at a temperature from 400° C. to 600° C. for a time from 1 hour to 5 hours.

The oxidized mixture is then added to a liquid and subjected to machine separation, such as centrifugation at a low as possible speed for a suitable period of time. Examples of the liquid include water, deionized water, or an organic liquid such as an alcohol. The machine separation separates the salt from the NDs, enabling the collection of the purified NDs. The low speed is employed to minimize/reduce damage to and/or minimize/reduce agglomeration of the NDs. In one embodiment, the oxidized mixture is centrifuged at a speed of 30 rcf to 25,000 rcf for a time from 10 seconds to 60 minutes. In another embodiment, the oxidized mixture is centrifuged at a speed of 100 rcf to 10,000 rcf for a time from 30 seconds to 30 minutes. In yet another embodiment, the oxidized mixture is centrifuged at a speed of 500 rcf to 5,000 rcf for a time from 1 minute to 15 minutes.

Purified NDs are collected. The NDs are characterized in that very little to no detectable impurities are present and/or the size distribution of the purified NDs is relatively narrow, especially compared to similar oxidation-centrifugation process when a salt is not used. The NDs are essentially pure; meaning the collected NDs are at least 99.9% by weight NDs, with less than 0.1% by weight impurities such as amorphous carbon nanoparticles. In another embodiment, the collected NDs are at least 99.95% by weight NDs, with less than 0.05% by weight impurities such as amorphous carbon nanoparticles. In yet another embodiment, the collected NDs are at least 99.99% by weight NDs, with less than 0.01% by weight impurities such as amorphous carbon nanoparticles.

According to the method of the present invention, the purified NDs are not agglomerated.

In another aspect, the present invention provides a method of making essentially pure NDs which comprises the following steps:

mixing raw NDs (with a size below 1 μm) with at least one salt to form a mixture;

heating the mixture at a temperature from 200° C. to 1,000° C. for a time from 10 minutes to 10 hours; and combining a liquid with the heated mixture and centrifuging at a speed of 30 rcf to 25,000 rcf for a time from 10 seconds to 60 minutes to provide essentially pure NDs with less than 0.01% by weight of impurities.

In the method of making essentially pure NDs according to the present invention, wherein the raw NDs includes impurities comprising ultra-small (<10 nm) sized NDs, amorphous carbon nanoparticles, metal, and metal oxides.

NDs are initially mixed with a suitable amount salt before heating. In one embodiment, a unit weight of NDs is mixed with 0.5 to 50 times an amount of a salt. In yet another embodiment, a unit weight of ND is mixed with 1 to 10 times an amount of a salt.

The salt is any salt that facilitates surface oxidation of NDs. A salt is an ionic compound having an anion and cation. General examples of salts that can be employed include one or more of alkaline earth metal halogens, sulfates, persulfates, nitrates, phosphates, and the like; alkali metal halogens, sulfates, persulfates, nitrates, phosphates, and the like; transition metal halogens, sulfates, persulfates, nitrates, phosphates, and the like; ammonium halogens, sulfates, persulfates, nitrates, phosphates, and the like; quaternary alkyl ammonium halogens, sulfates, persulfates, nitrates, phosphates, and the like. Specific examples of salts that can be employed include one or more of sodium chloride, magnesium chloride, potassium chloride, calcium chloride, ammonium chloride, sodium sulfate, magnesium sulfate, potassium sulfate, calcium sulfate, ammonium sulfate, and the like.

The ND/salt mixture is then heated at a suitable temperature for a suitable period of time to facilitate surface oxidation of NDs. In one embodiment, the ND/salt mixture is heated at a temperature from 300° C. to 800° C. for a time from 30 minutes to 8 hours. In another embodiment, the ND/salt mixture is heated at a temperature from 400° C. to 600° C. for a time from 1 hour to 5 hours.

The oxidized mixture is then added to a liquid and subjected to machine separation, such as centrifugation at a low as possible speed for a suitable period of time. Examples of the liquid include water, deionized water, or an organic liquid such as an alcohol. The machine separation separates the salt from the NDs, enabling collection of the purified NDs. The low speed is employed to minimize/reduce damage to and/or minimize/reduce agglomeration of the NDs. In one embodiment, the oxidized mixture is centrifuged at a speed of 100 rcf to 10,000 rcf for a time from 30 seconds to 30 minutes. In another embodiment, the oxidized mixture is centrifuged at a speed of 500 rcf to 5,000 rcf for a time from 1 minute to 15 minutes.

The liquid is selected from the group consisting of water, deionized water, an organic liquid, such as methanol, ethanol, and combination thereof.

The resulting essentially pure NDs are collected. The NDs are characterized in that very little to no detectable impurities are present and/or the size distribution of the purified NDs is relatively narrow, especially compared to similar oxidation-centrifugation process when a salt is not used. The NDs are essentially pure meaning that the collected NDs are at least 99.9% by weight NDs, with less than 0.1% by weight impurities such as amorphous carbon nanoparticles. In another embodiment, the collected NDs are at least 99.95% by weight NDs, with less than 0.05% by weight impurities such as amorphous carbon nanoparticles. In yet another embodiment, the collected NDs are at least 99.99% by weight NDs, with less than 0.01% by weight impurities such as amorphous carbon nanoparticles.

Desirably, the essentially pure NDs made by the method according to the present invention are not agglomerated.

The present invention will be further illustrated with reference to the detailed examples below. It is necessary to state that, the embodiments below are only for illustration, but not for limitation of the present invention. Various alterations that are made by a person skilled in the art in accordance with teaching from the present invention should be within the scope claimed by the claims of the present invention.

Example 1

Salt-Assisted Air Oxidation Method (SAAO Method)

NDs with a mean particle size of 200 nm (HPHT, PolyQolor, China) were used as the starting material.

(1) 0.5 g of NDs were mixed with 2.5 g of sodium chloride (NaCl, 99.5%, Sigma-Aldrich), and they were heated at 500° C. for 5 hours in air.

(2) 600 mg of the resultant sample was dispersed in 1 mL of deionized water and sonicated for 1 hour, and the NDs were then purified with deionized water 3 times by centrifugation (first: 1,000 rcf, 5 minutes; second: 3,000 rcf, 5 minutes; third: 8,000 rcf, 10 minutes).

(3) The purified NDs were redispersed in deionized water and sonicated for 10 minutes to obtain well-dispersed ND suspension for further characterizations.

Comparative Example 1

For comparison, conventional air oxidation of NDs was performed in parallel to Example 1, i.e., no NaCl added in the starting material.

(1) 0.5 g of NDs were heated at 500° C. for 5 hours in air.

(2) 100 mg of the resultant sample was dispersed in 1 mL of deionized water and sonicated for 1 h, and the NDs were then purified with deionized water 3 times by centrifugation (11,000 rcf, 10 minutes).

(3) The purified NDs were redispersed in 1 mL of deionized water and sonicated for 10 minutes to obtain well-dispersed ND suspension for further characterizations.

Characterizations

Comparison of NDs of Example 1 and Comparative Example 1

(I) Unremoved Impurities Associated with Conventional Air Oxidation

Figure 2:
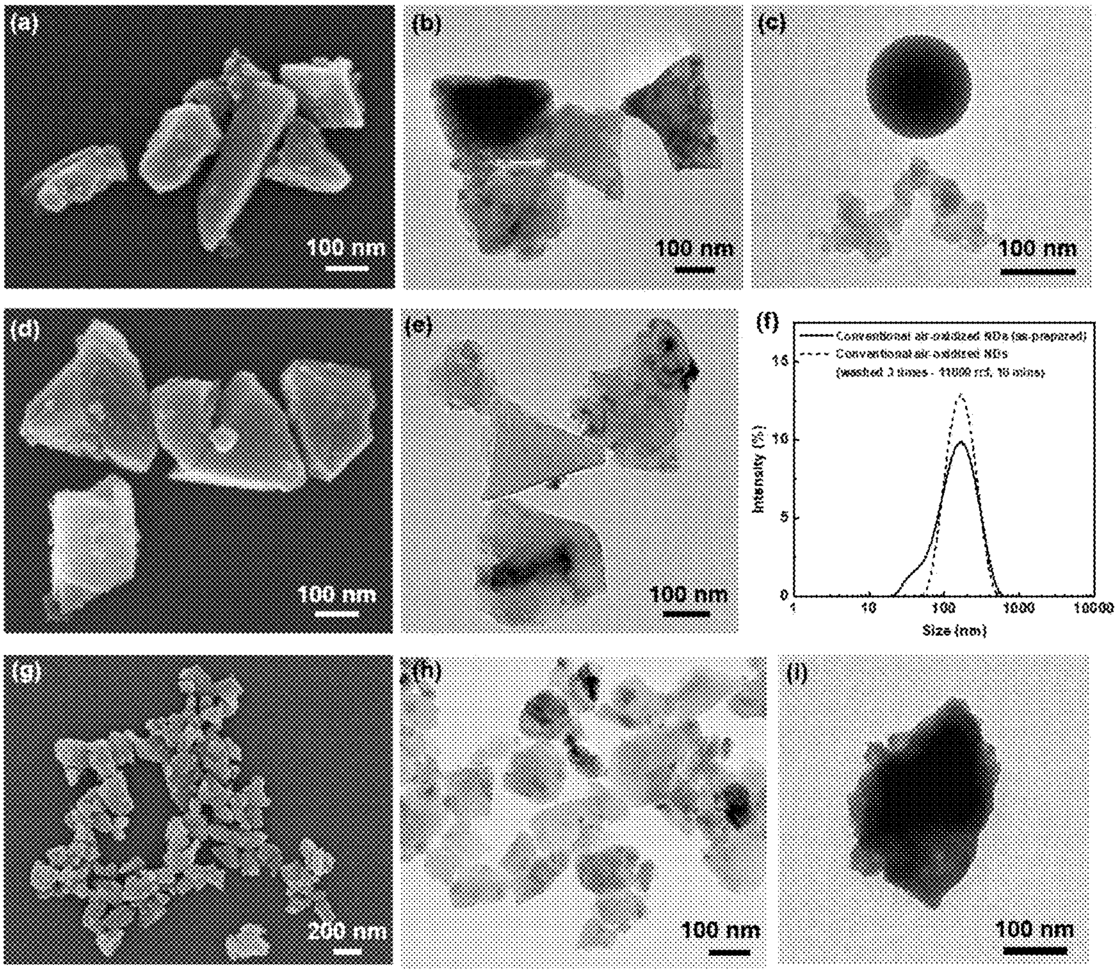
FIG. 2 depicts the (a) SEM and (b) TEM images of raw NDs. (c) TEM image of the impurities observed in raw NDs. (d) SEM and (e) TEM images of the conventional oxidized NDs after three times (11,000 rcf, 10 minutes) of thoroughly washing. (f) DLS size distribution of the as-prepared and detailed washed air-oxidized NDs. (g) SEM and (h) TEM images of the commercial NDs that have been tri-acid treated before shipment. (i) TEM image of the conventional air-oxidized (500° C., 5 hours) NDs after 50 days' incubation in DI water.

To evaluate the performance of the conventional air oxidation approach (FIG. 1 (*a*)), the raw NDs powder was directly heated alone in a furnace at 500° C. for 5 hours in air. The resultant sample was dispersed in deionized (DI) water for further characterizations. As indicated by the electron microscopy images (FIG. 1 (*b*), (*c*)), the conventional air-oxidized NDs were normally found to be covered by a large quantity of small-sized (<50 nm) nanoparticles (indicated by black arrows in FIG. 1 (*c*)). In fact, the observed phenomenon was almost the same as that in the untreated sample (FIG. 2 (*a*), (*b*)). These observations confirmed that it was impossible to obtain NDs with a well-defined surface using the conventional air oxidation treatment. Next, 3 rounds of washing procedure (with high-speed centrifugation, 11,000 rcf, 10 minutes) were tried to clear these unwanted impurities, but there was almost no improvement after the cleaning treatment (FIG. 2 (*d*), (*e*)). Even the harsh tri-acid washing method cannot help, as evidenced by the commonly observed small-sized nanoparticles associated with commercial NDs that are known to have already been tri-acid washed (FIG. 2 (*g*), (*h*)). Due to their ultra-small size and high surface energy, these small-sized nanoparticles showed a high binding affinity to the surface of the NDs. This strong binding affinity might be attributable to their ionic interactions, van der Waals interactions and hydrogen bonding, which is similar to the reported strong affinities of oxygen-terminated NDs toward various proteins. Thus, these small-sized nanoparticles (impurities) were hard to remove using common separation methods (FIG. 2 (*d-h*)).

Surprisingly, there seemed to be some newly generated portions (<nm) after the conventional air oxidation treatment, as indicated by the significantly broadened DLS spectrum of the resultant NDs powder directly dispersed in deionized water (FIG. 1 (*g*)). One hypothesis for these observed impurities is that the ultra-small-sized NDs were formed by the milling process, which is a necessary step in the production of HPHT NDs. These portions could also be attributed to the desorption of the ultra-small-sized NDs from the "bigger" ones after oxidation, as their mutual interactions might have been weakened through the high-temperature treatment. Therefore, some of those desorbed nanoparticles might fall off when dispersing the oxidized NDs in water for DLS measurement, which induced the broadened DLS spectrum and a reduction in the measured average size (from ~200 nm to ~120 nm). Another possibility might be that these impurities were newly emerging materials rather than NDs. The detailed investigation of the observed newly generated impurities will be discussed in Section (IV). The existence of unremoved impurities significantly limits the potential usefulness of NDs, affecting their morphology, binding capacity, and optical properties (e.g., charge states, fluorescence lifetime). Furthermore, the uncertainty of the nonspecific interactions between those impurities and NDs means that the host particles have a time-varying surface (FIG. 2 (*i*)) which inhibits their use in many potential applications.

(II) Clean and Rounded NDs by the SAAO Method

Figure 3:
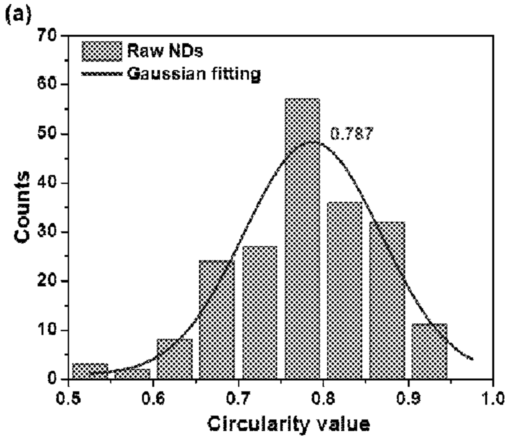
FIG. 3 depicts the distribution of circularity of (a) raw NDs and (b) SAAO NDs. The circularity was obtained by randomly choosing 200 particles from their TEM images for each sample, and then analyzed using ImageJ software. The circularity is defined as $4A\pi/(P^2)$ with A being its area and P its perimeter. A value of 1.0 indicates a perfect circle. As the value approaches 0.0, it indicates an increasingly elongated shape. The results indicate that the SAAO NDs are more rounded than the raw NDs.

The failure to remove the adsorbed impurities on the surface of NDs was due partly to the close packing of ND powder, and partly to deficiencies (e.g., incomplete or spontaneous oxidation) in the oxidation process. To overcome this, the so-called SAAO method, i.e., mixing NDs with salt crystals (i.e., NaCl or KCl) before the thermal treatment was proposed. In a typical experiment, the raw ND powder was mixed well with NaCl crystals with a mass ratio of 1:5, and the mixture was then routinely processed (heated at 500° C. in a furnace for 5 hours in air), as depicted in FIG. 1 (*d*). After the SAAO treatment, the representative SEM (FIG. 1 (*e*)) and bright-field TEM (FIG. 1 (*f*)) images of the resultant NDs clearly showed a homogeneous distribution of resultant NDs containing a clear boundary and clean surface which is rarely, if ever, found in NDs oxidized in the conventional way (FIG. 1 (*c*)). The DLS result (FIG. 1 (*g*)) also showed that the size distribution of the NDs had shifted by tens of nm, involving a considerable reduction in the average size of the resultant NDs (from −200 nm to −170 nm), and this observation was consistent with the results of electron microscopy images. Significantly, the NDs also lost their original shard-like shape and became rounded (FIG. 3 shows the quantitative results).

Figure 4:
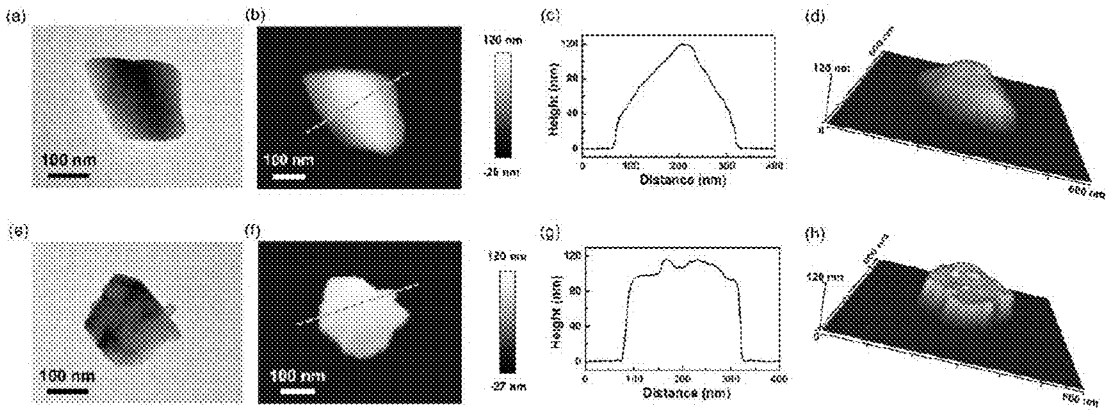
FIG. 4 depicts the TEM-AFM (Atomic Force Microscopy) correlated characterizations of the (a-d) SAAO ND and (e-h) raw ND.

To further evaluate the performance of this novel method, the detailed morphology features of individual NDs was carefully characterized using a TEM-AFM correlated microscopy imaging technique (FIG. 4). A randomly chosen ND, either SAAO treated or raw, was first viewed and located by TEM, and subsequently measured by AFM. As shown in FIG. 4 (*c*), the randomly picked line profile indicated a smooth surface of the chosen particle treated by our SAAO method, and this was consistent with the reconstructed three-dimensional (3D) AFM image (FIG. 4 (*d*)). By comparison, the raw ND particle showed a rough surface associated with unavoidably adsorbed small-sized nanoparticles, as evidenced by the line profile (FIG. 4 (*g*)) and reconstructed 3D AFM image (FIG. 4 (*h*)). The implications of this breakthrough are considerable, i.e., unlike the use of highly oxidized molten nitrates ($KNO_3$), the solid-state, non-oxidizing alkali chlorides (e.g., NaCl and KCl) were used on NDs oxidation, but achieved the same shape evolution (rounding effect), smoother and cleaner surface of NDs. The improved optical properties, reduced surface spin noise, improved surface roughness, reduced friction in-between particles and reduced anisotropy present in the SAAO NDs enable them to be used in a wide range of different applications, including photonics, quantum sensing, and imaging.

(III) Crystallinity and Surface Chemistry Characterizations of NDs

Figure 5:
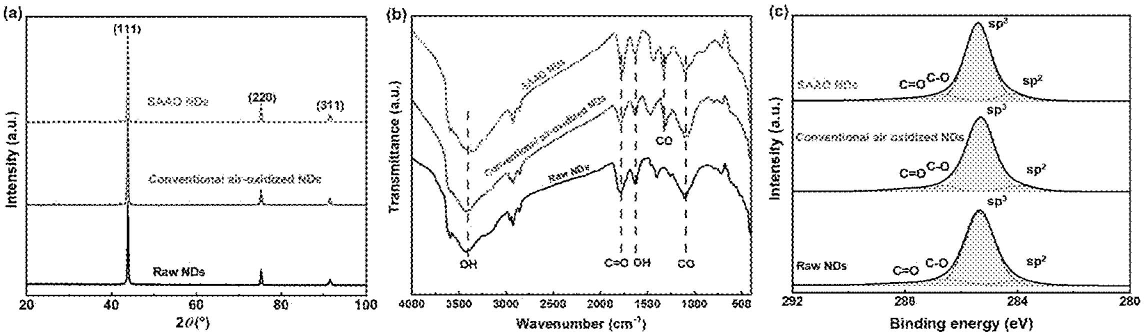
FIG. 5 depicts the (a) X-ray Powder Diffraction (XRD) (b) Fourier Transform Infrared Spectroscopy (FTIR) and (c) high-resolution X-ray Photoelectron Spectroscopy (XPS) carbon is spectra of the raw, conventional air-oxidized, and SAAO NDs.

The XRD results (FIG. 5 (*a*)) show the pure crystalline nature of all samples, i.e., only the characteristic peaks of diamond were found in the XRD spectra. The peaks at 43.9°, 75.2° and 91.5° are corresponding to the (111), (220) and (311) planes of the cubic diamond lattice, respectively.

FIG. 5 (*b*) depicts the FTIR spectra of the raw, conventional, and SAAO NDs. A strong peak observed in the range of 1,000-1,300 $cm^{-1}$ is ascribed to the C—O stretching vibrations. Due to the air oxidation treatment, the peak at 1,310 $cm^{-1}$ that appears very weakly in the raw NDs and prominently in the air-oxidized ones (both salt-assisted and conventional) is attributed to C—O bending vibration. The peak appearing at 1,630 $cm^{-1}$ is owing to the —OH bending vibration, which comes from either the carboxyl group (—COOH) of the ND surface or water molecules adsorbed on the sample surface. A broad peak around 3,500 $cm^{-1}$ is similar because of the —OH stretching mode. And the peak at ~1,770 $cm^{-1}$ is attributed to the C═O stretching mode indicating the presence of carboxyl group on surface.

FIG. 5 (*c*) depicts the high-resolution XPS carbon 1s spectra of the samples. The dominant peak observed at ~285.3 eV is assigned to diamond $sp^3$ carbon. Two satellite peaks at ~286.6 and ~287.6 eV are corresponded to C—O and C═O, respectively. The peak at ~284 eV is assigned to $sp^2$ carbon. Thus, the surface chemistry of the SAAO NDs was identical with the conventional air-oxidized NDs.

(IV) The Newly Generated "Impurities" During Conventional Oxidation

Figure 7:
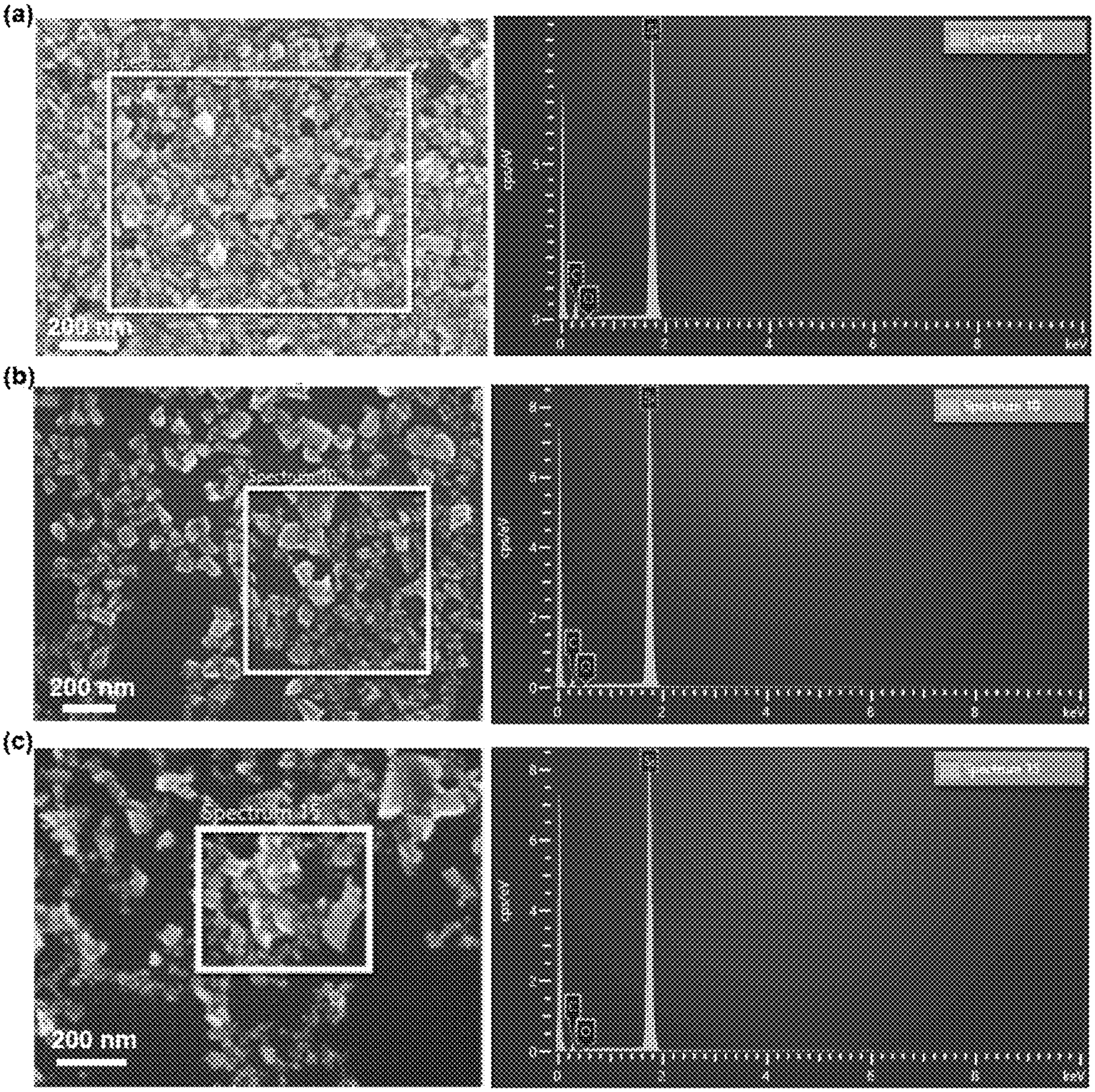
FIG. 7 depicts the SEM images and Energy-Dispersive X-ray Spectroscopy (EDX) spectra of the upper solution content of (a) raw NDs, (b) 2 hours, and (c) 5 hours conventional air-oxidized NDs suspensions.
Figure 8:
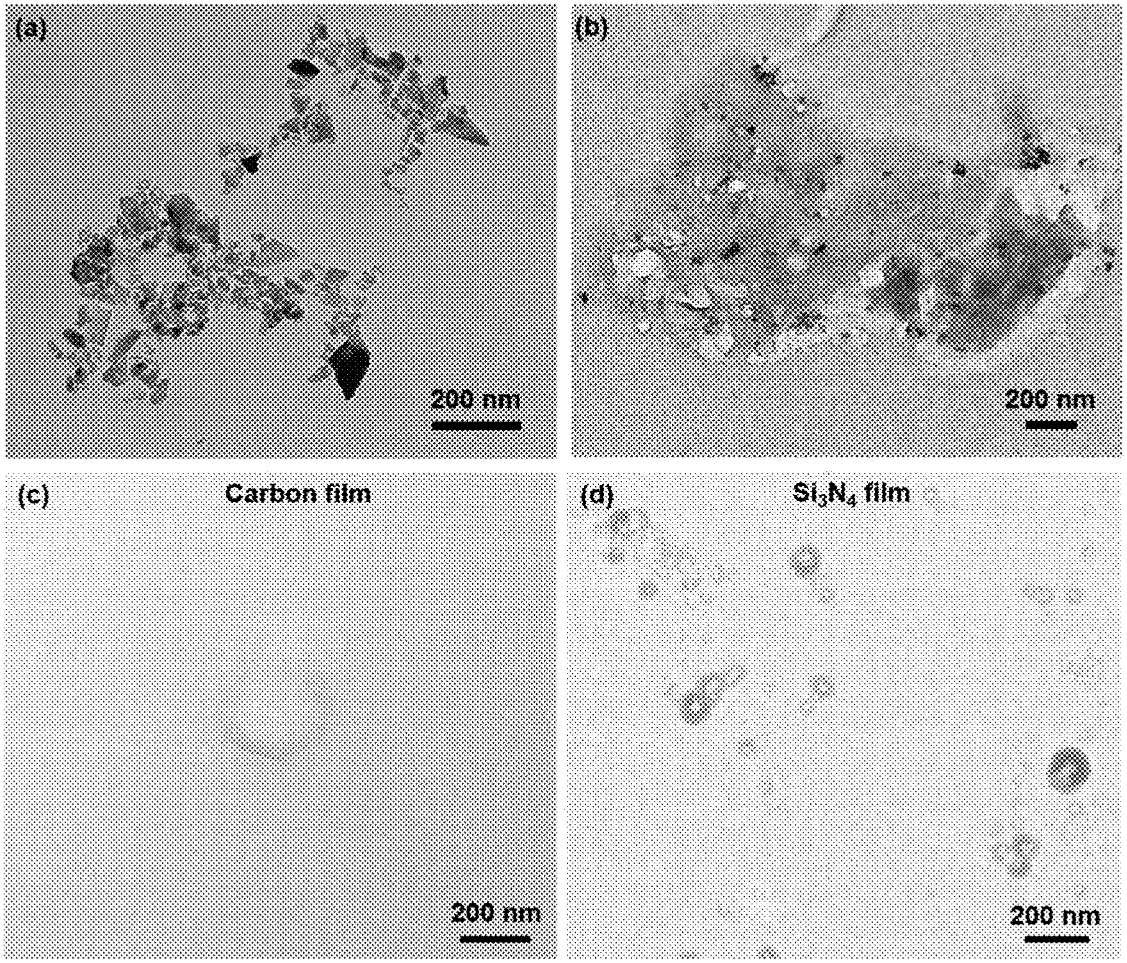
FIG. 8 depicts the TEM images of the upper solution content of (a) raw NDs and (b) conventional 5 hours air-oxidized NDs suspensions. The small-sized impurities found in conventional 5 hours air-oxidized NDs upper solution on (c) commonly used carbon film coated TEM grid and (d) $Si_3N_4$ film coated TEM grid.

As indicated from the abovementioned results (FIG. 1 (*g*)), a significant portion of nanoparticles (<50 nm) was found in NDs just after conventional air oxidation. In contrast, this was not the case in our SAAO sample at all. To identify the origin of those newly generated "impurities", they were carefully separated from the main portion of the sample ("bigger" NDs with a size of ~200 nm) by putting them undisturbed in DI water for 7 days (see illustrations in FIG. 6 (*a*)). Next, we observed a large quantity of small-sized nanoparticles, with distinct size and morphology compared with "bigger" NDs (FIG. 6 (*b*)), in the supernatant. Furthermore, it was confirmed that the majority of these small-sized nanoparticles were amorphous materials, as indicated by the TEM diffraction patterns (see insert in FIG. 6 (*c*)). And the corresponding elemental analysis (EDX spectra in FIG. 7) showed the observed small-sized nanoparticles were mainly consisting of carbon. By comparison, only NDs (a few nm to −200 nm) were observed in the supernatant of the aqueous dispersion of raw NDs after similar separation (FIG. 8 (*a*)), indicating the non-diamond impurities (amorphous carbon nanoparticles) should be generated during the conventional air oxidation process.

Figure 6:
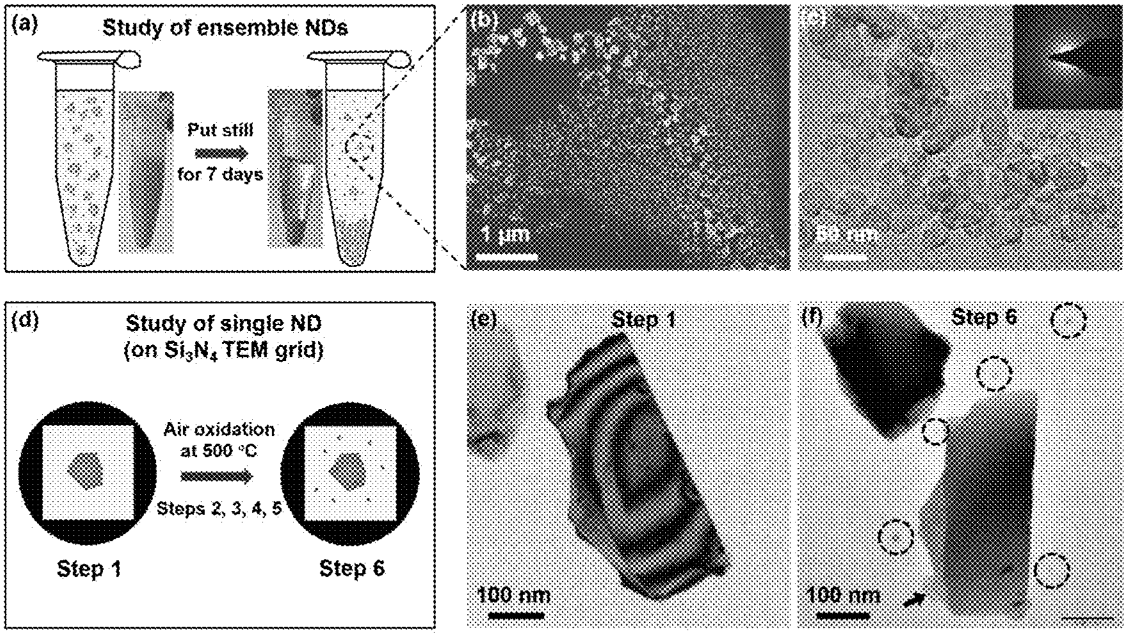
FIG. 6 depicts the origin of the observed newly generated impurities during oxidation. (a) Schematic illustration of the collection process of impurities in conventional air-oxidized NDs. (b) SEM image of the content in the upper solution. (c) TEM image of the non-diamond particles. The inset of (c) is the Selected Area Electron Diffraction (SAED) pattern of the same clusters. (d) Schematic illustration of the process of the air oxidation study of single ND. Pre-cleaned NDs were first deposited onto $Si_3N_4$ film supported TEM grid, and one chosen ND was viewed and located by TEM (Step 1). The sample was then air oxidized at 500° C. for 5 times (Step 2, 3, 4 and 5:1 hour; Step 6: 2 hours) and viewed again under TEM after each time. The TEM images of the chosen ND after Steps 1 and 6 are shown in (e) and (f), respectively.

On the other hand, a time-dependent oxidation study (FIG. 6 (*d*)) on pre-cleaned single ND (randomly chosen) was performed directly on the TEM grid. To rule out the possible influence of originally involved non-diamond impurities which were occasionally found in uncleaned raw NDs (FIG. 2 (*c*)), the pre-cleaned NDs (with high-level cleanliness) was used\as the starting material. As shown in FIG. 6 (*e*) (TEM image of one typical ND before the time-dependent oxidation study), nothing was found either on the surface or in the vicinity of this chosen particle. Gradually, some ultrasmall dots (~2 nm) emerged either near or on the ND (indicated by circles and arrow in FIG. 6 (*f*)) after several rounds of oxidation which were designed to accumulate the quantity of those generated impurities. As a result, the observed small dots (judged by their morphology and TEM contrast) could be attributed to amorphous carbon nanoparticles generated during the process of oxidation.

(V) The Mechanism of the SAAO Method

Figure 9:
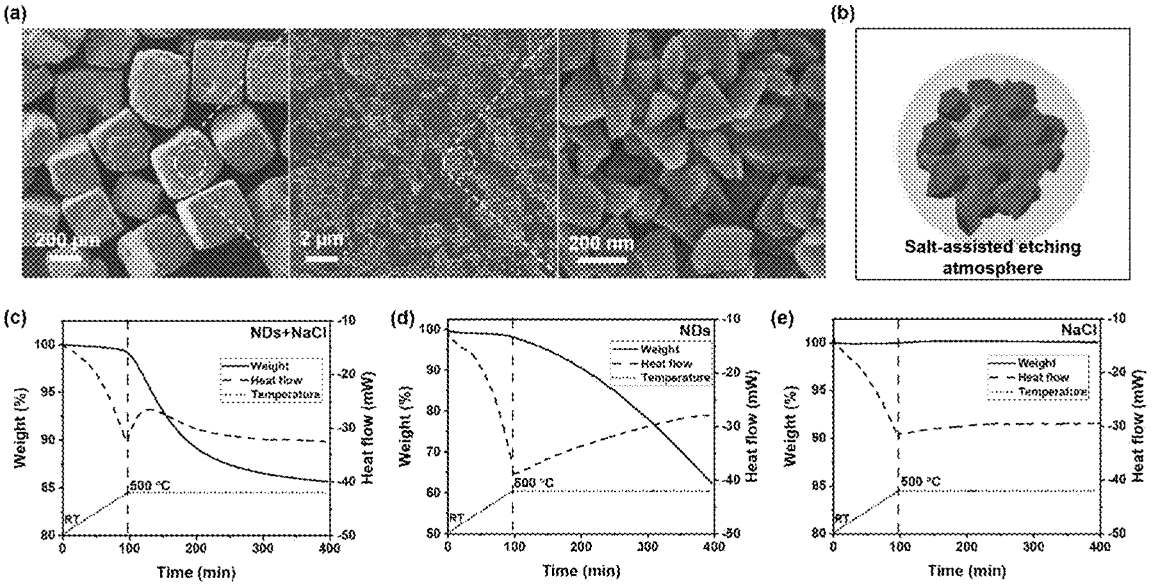
FIG. 9 depicts mechanism of the SAAO method: (a) SEM images of the NDs and NaCl mixtures (NDs+NaCl) after oxidation without any further cleaning processes; (b) Schematic illustration of the "salt-assisted etching atmosphere" generated during high-temperature air oxidation; the Thermogravimetric Analysis and Differential Scanning calorimetry (TGA-DSC) curves of (c) NDs+NaCl, (d) NDs, and (e) NaCl, all of which were recorded under the same conditions, that is, heated from room temperature (RT) to 500° C. with a heating rate of and kept at 500° C. for 5 hours.

To investigate the underlying mechanisms of the developed SAAO method, the mixtures of NDs and NaCl (after oxidation) were firstly checked to see if the cleanliness of NDs on salt particles changed directly without any further cleaning processes (e.g., washing and centrifugation). As shown in FIG. 9 (*a*), the adsorbed NDs, on the surface of salt particles (size in a few hundred micrometers), were already found to be clean without any apparent small-sized nanoparticles adsorbed. Also, the modality of NDs (a thin "layered" film) on the salt surface was quite different from that involved in the conventional oxidation process (highly aggregated powder form). Therefore, considering the difference of NDs' modality during oxidation, it is first hypothesized that the salt particles might have served as thermal managing agents among particles such as spacers, leading to a more even and rapid etching of the NDs.

Figure 10:
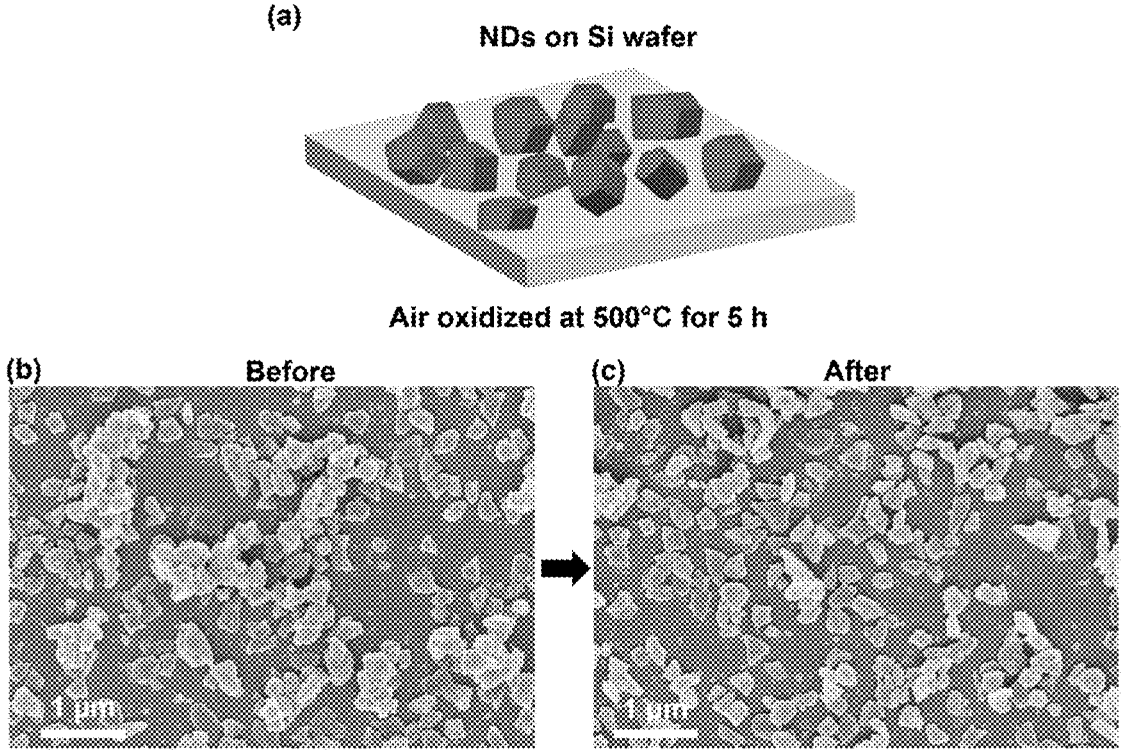
FIG. 10 depicts the (a) schematic illustration of the NDs on Si wafer for oxidation that mimics the NDs on salt surface. SEM images of the NDs on Si wafer (b) before and (c) after air oxidation at 500° C. for 5 hours.

To verify this, an air oxidation experiment (FIG. 10) was performed in which NDs were coated on the non-salt substrate (i.e., Si wafer) mimicking the salt surface. Unfortunately, nothing happened to the NDs on the Si wafer after air oxidation at 500° C. for 5 hours. This indicated that the formation of "layered" ND film could not be the actual mechanism of the SAAO method.

The above results indicate that the NaCl might also be involved in the oxidation process of NDs, not just acting like spacers. Inspired by the well-known fact that the chloride salts (e.g., NaCl and KCl) could extensively corrode metals or alloys at the temperature of 400-700° C. due to the generated highly corrosive gases, therefore, the "etching atmosphere" generated by NaCl at high temperature (FIG. 9 (*b*)) would also significantly improve the etching rate of NDs (e.g., etching away the adsorbed small-sized nanoparticles and rounding NDs). To verify this hypothesis, the TGA-DSC measurements (FIG. 9 (*c-e*)) were performed, which are used as a golden standard used to check the potential chemical reactions among solid substances. The measurements were conducted under the same conditions which were adopted to oxidize NDs previously, e.g., heated from room temperature (RT) to 500° C. with a heating rate of 5° C./minutes and kept at 500° C. for 5 hours in the air. The differences between the mixture of NDs and NaCl (FIG. 9 (*c*)) and NDs alone (FIG. 9 (*d*)) were clearly observed during the heat preservation period (5 hours at 500° C.). The weight of NDs+NaCl decreased rapidly from 100 minutes to 250 minutes (i.e., the first 150 minutes after the temperature reached 500° C.), and it decreased slowly subsequently due to most of the NDs had already been oxidized (the weight of NaCl was assumed unchanged, obtained from FIG. 9 (*e*)), indicating that NaCl accelerated the oxidation process of NDs. At the same time, a peak at ~130 minutes (i.e., around 30 minutes after the temperature reached 500° C.) was only observed in the mixture (NDs+NaCl) sample's DSC curve, indicating that certain chemical reactions indeed happened there. On the other hand, the oxidation of pure NDs was a rather mild process, the weight loss gradually reached 37.40% after the 5 hours oxidation. The results above demonstrated that NaCl would accelerate the oxidation process of NDs under the help of the "salt-assisted etching atmosphere" generated at high temperature, leading to the etching of both diamond and non-diamond carbons, other impurities like metals, etc.

Example 2

The Cleaning Process of the SAAO Methods

NDs with a mean particle size of 200 nm were used as starting material.

(1) 0.5 g of NDs were mixed with 2.5 g of NaCl (99.5%, Sigma-Aldrich), and they were heated at 500° C. for 2 hours in air.

(2) 600 mg of the resultant sample was dispersed in 1 mL of deionized water and sonicated for 1 hour, and the NDs were then purified with deionized water 1 time by centrifugation (1,000 rcf, 5 minutes).

(3) The purified NDs were redispersed in deionized water and sonicated for 10 minutes to obtain well-dispersed ND suspension for further characterizations.

Comparative Example 2

For comparison, conventional air oxidation of NDs was performed in parallel to Example 2, i.e., no NaCl added in the starting material.

(1) 0.5 g of NDs were heated at 500° C. for 2 hours in air.

(2) 100 mg of the resultant sample was dispersed in 1 mL of deionized water and sonicated for 1 h, and the NDs were then purified with deionized water 1 time by centrifugation (1,000 rcf, 10 minutes).

(3) The purified NDs were redispersed in 1 mL of deionized water and sonicated for 10 minutes to obtain well-dispersed ND suspension for further characterizations.

Characterizations

Figure 11:
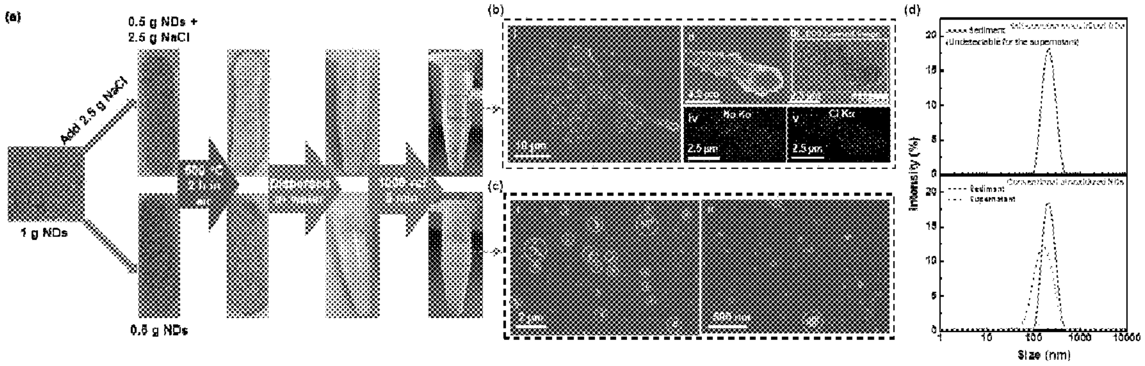
FIG. 11 depicts the comparison of the cleaning process of the salt-assisted and conventional air oxidation processes (500° C., 2 hours). (a) Photos showing the detailed processes of salt-assisted and conventional air oxidation of NDs. SEM characterization of the supernatant of the (b) salt-assisted, and (c) conventional air-oxidized NDs aqueous solution after centrifugation. In (c), 200 nm NDs are indicated by circles. (d) DLS measurement of the particle size distribution of the sediment and supernatant of the oxidized NDs aqueous solution after centrifugation (1,000 rcf, 5 minutes). The particle concentration of the supernatant of the SAAO NDs solution is too low to detect in DLS measurement.

The procedures of the SAAO of NDs in Example 2 and conventional (no salt added) air oxidation of NDs in Comparative Example 2 are shown in FIG. 11, in which (a) Photos showing the detailed processes of salt-assisted and conventional air oxidation of NDs. SEM characterization of the supernatant of the (b) salt-assisted, and (c) conventional air-oxidized NDs aqueous solution after centrifugation. In (c), NDs are indicated by circles. (d) DLS measurement of the particle size distribution of the sediment and supernatant of the oxidized NDs aqueous solution after centrifugation (1,000 rcf, 5 minutes). The particle concentration of the supernatant of the SAAO NDs solution is too low to detect in DLS measurement.

As can be seen from FIG. 11 (*a*), the SAAO NDs can be easily collected by low speed (1,000 rcf) and short time (5 minutes) centrifugation, while the no-salt oxidized NDs is relatively hard to collect (higher speed such as 11,000 rcf and longer time are needed). These required additional centrifugation steps not only lead to more waste of NDs sample, but also bring the severe issue of NDs agglomeration.

From the DLS measurement of FIG. 11 (*d*), there is a broad particle distribution in the supernatant of the no-salt oxidized NDs solution, indicating some newly emerging portions rather than NDs only in solution. This observation is consistent with SEM images in FIG. 11 (*c*), the non-diamond nanoparticles can be easily observed, and the formation mechanism of these impurities has been discussed in Section (IV) of Example 1. However, the supernatant of the SAAO NDs solution is very clear, mainly containing Na or Cl ions, seeing FIG. 11 (*b*), and there is no detectable signal in DLS. Furthermore, the sediment of the SAAO NDs solution has a very high purity without any comparable impurities generated. In fact, the salt-assisted approach significantly reduces the size of generated non-diamond nanoparticles to a few nm which can be totally removed by relatively low centrifugation speed.

The above examples demonstrate the cleaning process of the SAAO method is much easier than that of the conventional method, i.e., pure NDs (without any detectable impurity nanoparticles) can be produced by one-step processing (centrifugation at 1,000 rcf for 5 minutes) after air oxidation, no need for any further centrifugation steps.

Example 3

The Suitable SAAO Conditions for 200 nm NDs

NDs with a mean particle size of 200 nm were used as starting material.

(1) 0.5 g of NDs were mixed with 2.5 g of NaCl (99.5%, Sigma-Aldrich), and they were heated at 400° C. for 2 hours in air.

(2) 0.5 g of NDs were mixed with 2.5 g of NaCl (99.5%, Sigma-Aldrich), and they were heated at 500° C. for 1 hour in air.

(3) 0.5 g of NDs were mixed with 2.5 g of NaCl (99.5%, Sigma-Aldrich), and they were heated at 500° C. for 2 hours in air.

(4) 0.5 g of NDs were mixed with 2.5 g of NaCl (99.5%, Sigma-Aldrich), and they were heated at 500° C. for 10 hours in air.

(5) 0.5 g of NDs were mixed with 2.5 g of NaCl (99.5%, Sigma-Aldrich), and they were heated at 500° C. for 20 hours in air.

(6) 0.5 g of NDs were mixed with 2.5 g of NaCl (99.5%, Sigma-Aldrich), and they were heated at 600° C. for 2 hours in air.

(7) 600 mg of the above resultant samples were dispersed in 1 mL of deionized water and sonicated for 1 hour, respectively. And the NDs were then purified with deionized water 3 times by centrifugation (first: 1,000 rcf, 5 minutes; second: 3,000 rcf, 5 minutes; third: 8,000 rcf, 10 minutes).

(8) The purified NDs were redispersed in deionized water and sonicated for 10 minutes to obtain well-dispersed ND suspensions for further characterization.

Comparative Example 3

For comparison, conventional air oxidation of NDs was performed in parallel to Example 3, i.e., no NaCl added in the starting material.

(1) 0.5 g of NDs were heated at 400° C. for 2 hours in air.

(2) 0.5 g of NDs were heated at 500° C. for 1 hour in air.

(3) 0.5 g of NDs were heated at 500° C. for 2 hours in air.

(4) 0.5 g of NDs were heated at 500° C. for 10 hours in air.

(5) 0.5 g of NDs were heated at 500° C. for 20 hours in air.

(6) 0.5 g of NDs were heated at 600° C. for 2 hours in air.

(7) 100 mg of the above resultant samples were dispersed in 1 mL of DI water and sonicated for 1 hour, respectively. And the NDs were then purified with deionized water 3 times by centrifugation (11,000 rcf, 10 minutes).

(8) The purified NDs were redispersed in 1 mL of deionized water and sonicated for 10 minutes to obtain well-dispersed ND suspensions for further characterizations.

Characterizations

Figure 12:
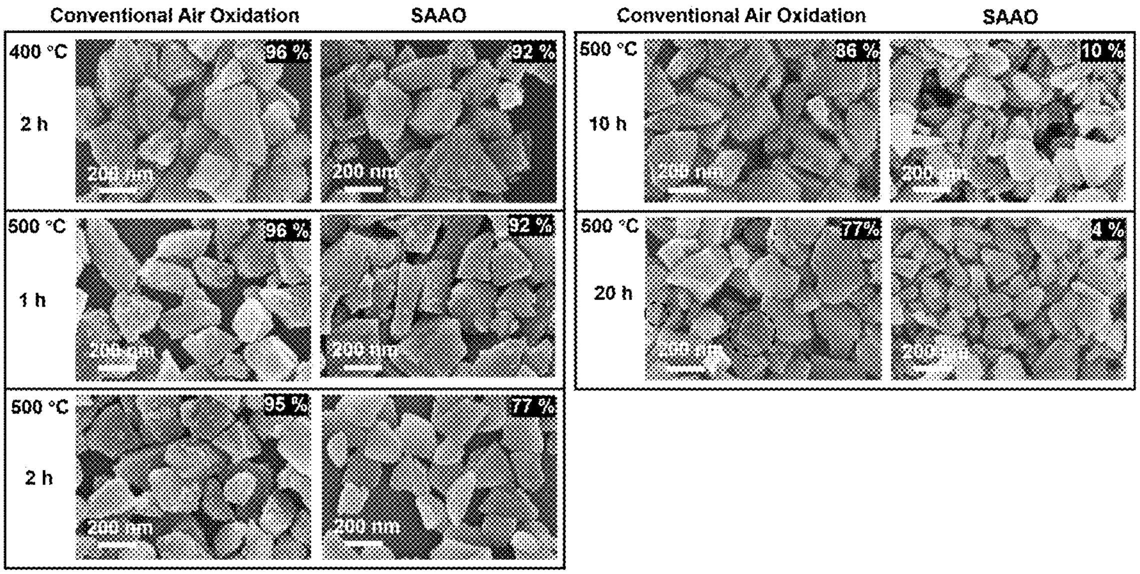
FIG. 12 depicts the SEM images (with yield indicated) of the conventional air-oxidized and SAAO NDs with different oxidation temperature and time.

As depicted in FIG. 12, starting from 2 hours (500° C.), the SAAO method would get clean and rounded NDs with a yield (i.e., the weight ratio of NDs after/before oxidation) of ~77%. On the other hand, the yield of the conventional air-oxidized NDs was reduced gradually from −96% to −77% when the oxidation time increased from 1 h to 20 h, and small-sized nanoparticles adsorbed on NDs surface remained unchanged until the oxidation time reached 20 hours. And only a few small-sized nanoparticles were still adsorbed on the surface (indicated by black circles) for the 20 hours conventional air-oxidized NDs; however, the shard-like shape remained unchanged (i.e., no rounding effect), which was different from the 2 hours SAAO NDs even though they had a similar yield (~77%). At the same time, 400° C. (2 hours) could hardly oxidize NDs, while 600° C. (2 hours) was too strong to control (with extremely low yields, ~6% for the conventional method, and ~0% for the SAAO method, respectively, SEM images are not shown in FIG. 12). Therefore, 500° C. and 2 hours of SAAO might be the ideal condition for the treatment of the 200 nm NDs with a clean surface and a relatively high yield. As for the most frequently discussed condition (i.e., 500° C., 5 hours) in Example 1, the yield of the SAAO method (~20%) was greatly lower than that of the conventional method (~90%), indicating that the presence of NaCl would accelerate the oxidation process of NDs.

Example 4

The Universality of the SAAO Method (KCl-assisted Air Oxidation of 50 nm NDs)

NDs with a mean particle size of 50 nm (HPHT, PolyQolor, China) were used as starting material.

(1) 0.5 g of NDs were mixed with 2.5 g of potassium chloride (KCl, 99.5%, Sigma-Aldrich), and they were heated at 500° C. for 2 hours in air.

(2) 600 mg of the resultant sample was dispersed in 1 mL of deionized water and sonicated for 1 hour, and the NDs were then purified with deionized water 3 times by centrifugation (first: 1,000 rcf, 5 minutes; second: 3,000 rcf, 5 minutes; third: 8,000 rcf, 10 minutes).

(3) The purified NDs were redispersed in deionized water and sonicated for 10 minutes to obtain well-dispersed ND suspension for further characterizations.

Characterizations

Figure 13:
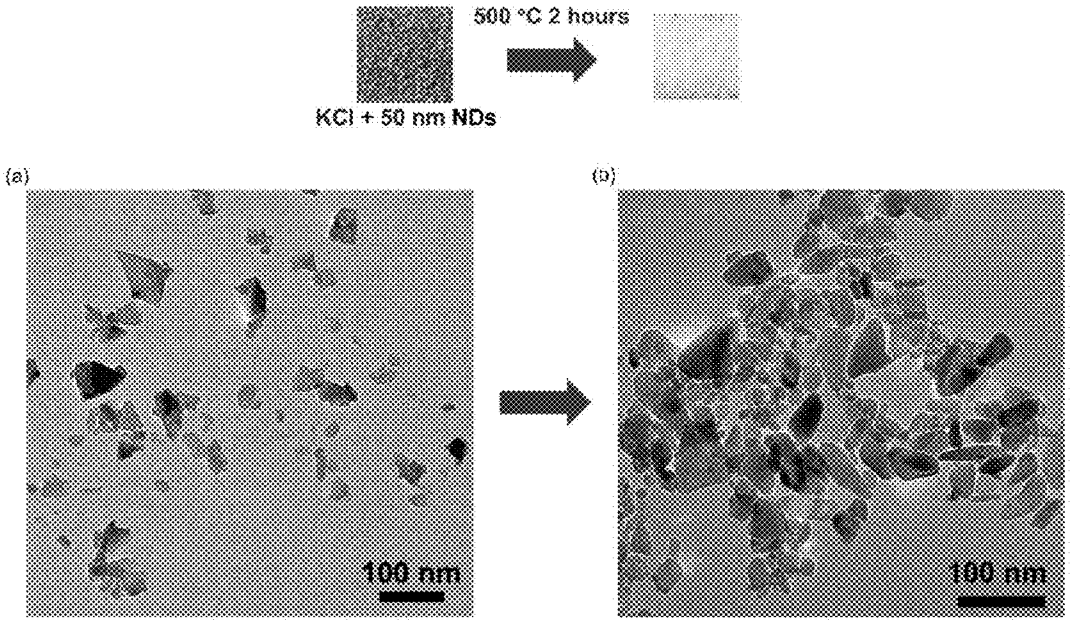
FIG. 13 depicts the KCl-assisted air oxidation of 50 nm NDs: TEM images of the (a) raw NDs and (b) NDs after 2 hours KCl-assisted air oxidation.

FIG. 13 depicts the results of KCl-assisted air oxidation of 50 nm NDs, which indicates that the developed SAAO method was not limited to 200 nm NDs or NaCl only, clean and rounded NDs of 50 nm could also be achieved by KCl-assisted air oxidation at 500° C. for 2 hours.

In summary, a simple, reliable and reproducible purification method, namely the salt-assisted air oxidation (SAAO) treatment was developed, which requires only one additional pre-step, i.e., mixing NDs with a proper amount of salt crystals (e.g., sodium chloride) prior to conventional oxidation. The developed method enables scale-up manufacturing of clean NDs, with a rounded shape transformed from the original shard-like shape. The impurity particles adsorbed on NDs were found to be etched by "etching atmosphere" introduced by NaCl at high temperatures. These findings will significantly enhance the scope of these little gemstones in diverse scientific and industrial fields, particularly in demanding areas such as biomedical and quantum sensing requiring stable and sound surface functionalities.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about".

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method for purifying nanodiamonds, comprising:

mixing the nanodiamonds with at least one salt to form a mixture;

heating the mixture at a temperature of 400° C. to 600° C. for a period of 1 hour to 5 hours; and combining an organic liquid with the heated mixture and centrifuging at a speed from 500 rcf to 5,000 rcf for a period from 1 minute to 15 minutes to provide purified nanodiamonds, wherein the at least one salt is selected from one or more of sodium chloride, magnesium chloride, potassium chloride, calcium chloride, and ammonium chloride, wherein the organic liquid is selected from the group consisting of methanol and ethanol.

2. The method of claim 1, wherein the nanodiamonds have a size below 1 μm.

3. The method of claim 1, wherein the nanodiamonds are mixed with 0.1 to 100 times by weight of the at least one salt.

4. The method of claim 1, wherein the purified nanodiamonds comprise at least 99.9% by weight nanodiamonds and less than 0.1% by weight impurities.

5. The method of claim 1, wherein the purified nanodiamonds are not agglomerated.

6. The method of claim 1, wherein the nanodiamonds are mixed with 0.5 to 50 times by weight of the at least one salt.

7. A method for preparing pure nanodiamonds, the method comprising:

mixing unprocessed nanodiamonds with at least one salt to form a mixture;

heating the mixture at a temperature of 400° C. to 600° C. in air for a period of 1 hour to 5 hours; and combining an organic liquid with the heated mixture and centrifuging at a speed of 500 rcf to 5,000 rcf for a period from 1 minute to 15 minutes to provide the pure nanodiamonds having less than 0.01% impurities by weight, wherein the at least one salt is selected from one or more of sodium chloride, magnesium chloride, potassium chloride, calcium chloride, or ammonium chloride.

8. The method of claim 7, wherein the unprocessed nanodiamonds have a size below 1 μm.

9. The method of claim 7, wherein the unprocessed nanodiamonds comprise impurities comprising ultra-small (<10 nm) sized nanodiamonds, amorphous carbon nanoparticles, metals, or metal oxides.

10. The method of claim 7, wherein the unprocessed nanodiamonds are mixed with 0.1 to 100 times by weight of the at least one salt.

11. The method of claim 7, wherein the pure nanodiamonds are not agglomerated.

12. The method of claim 7, wherein the nanodiamonds are mixed with 0.5 to 50 times by weight of the at least one salt.

13. The method of claim 7, wherein the organic liquid is selected from the group consisting of methanol and ethanol.

* * * * *